United States Patent
Balazich et al.

(10) Patent No.: US 7,805,634 B2
(45) Date of Patent: Sep. 28, 2010

(54) ERROR ACCUMULATION REGISTER, ERROR ACCUMULATION METHOD, AND ERROR ACCUMULATION SYSTEM

(75) Inventors: Douglas G. Balazich, Poughkeepsie, NY (US); Michael Billeci, Poughkeepsie, NY (US); Anthony Saporito, Highland, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 11/522,132

(22) Filed: Sep. 16, 2006

(65) Prior Publication Data

US 2008/0126830 A1 May 29, 2008

(51) Int. Cl.
*G06F 11/00* (2006.01)
(52) U.S. Cl. ....................................................... 714/10
(58) Field of Classification Search ....................... 714/10
See application file for complete search history.

(56) References Cited

U.S. PATENT DOCUMENTS

| 4,205,370 A | * | 5/1980 | Hirtle ........................... 714/45 |
| 4,661,953 A | * | 4/1987 | Venkatesh et al. ............. 714/42 |
| 5,383,201 A | * | 1/1995 | Satterlee et al. ................. 714/4 |
| 5,790,779 A | * | 8/1998 | Ben-Natan et al. ............ 714/39 |
| 5,862,316 A | * | 1/1999 | Hagersten et al. ............. 714/15 |
| 5,954,825 A | * | 9/1999 | Kaiser et al. ................... 714/43 |
| 6,499,113 B1 | * | 12/2002 | Tobin et al. .................... 714/19 |
| 7,266,726 B1 | * | 9/2007 | Ladd et al. ..................... 714/27 |

* cited by examiner

*Primary Examiner*—Robert Beausoliel
*Assistant Examiner*—Amine Riad
(74) *Attorney, Agent, or Firm*—John E. Campbell; Ido Tuchman

(57) ABSTRACT

In operating a dual core processor, a register file collects a history of the error state information for each core. The core error state data can be analyzed to understand the recovery sequence of events. The recorded error sequence over time presents a detailed history of the recovery sequence which is useful to understand complex error scenarios.

5 Claims, 1 Drawing Sheet

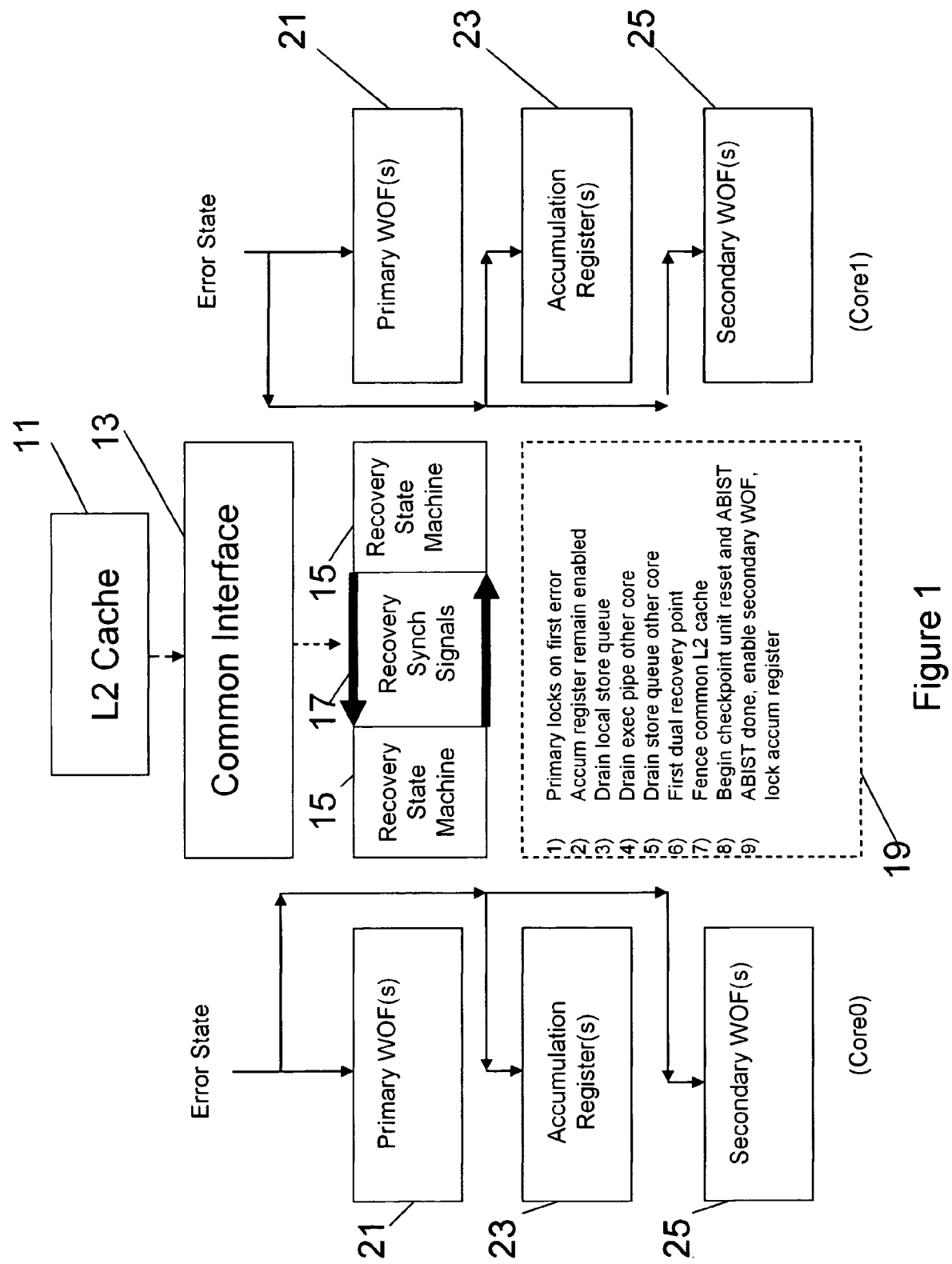

ERROR ACCUMULATION REGISTER, ERROR ACCUMULATION METHOD, AND ERROR ACCUMULATION SYSTEM

BACKGROUND

1. Field of the Invention

The invention relates to enhancing the ability of a system to respond to an unexpected hardware failure and correctly perform services by, for example either returning a system to a previous level of correct operation, or achieving a degraded level of correct operation.

2. Background Art

Many modern microprocessors have two processor cores on each CPU chip. Due to the sharing of resources, the cores on a given chip must go through their recovery and checkstop sequences together (even if one core did not detect any errors). This has allowed error situations where a large number of failures are indicated in a chip's debug data which may have originated on either core and potentially off chip. These complex error scenarios are becoming increasingly difficult to sort out and debug.

SUMMARY OF INVENTION

The problem is obviated by creating a register file to collect a history of the error state information for each core. The core error state data can be analyzed to understand the recovery sequence of events. The recorded error sequence over time presents a detailed history of the recovery sequence which is useful to understand complex error scenarios. Complex error scenarios occur when a recoverable error is escalated to a more severe level error and the reason for the more severe error needs to be understood. The advantage here is time saved in analysis and the accuracy in determining the sequence using only the available end state. Error analysis is faster and more exact with a recorded history of both cores recovery sequences.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates a WOF (Who's On First) register as utilized in a dual core processor architecture.

DETAILED DESCRIPTION

Modern CPU's have two or more processor cores on a chip. Due to the sharing of resources, complex error scenarios require detailed analysis to determine the cause and the appropriate recovery action. This is done by dedicated hardware that captures and preserves machine error state. The error state information is used by hardware to initiate the correct recovery action. Certain types of errors may occur which require more aggressive recovery action it is often necessary to understand the specific error sequence that occurs which results in a higher level of recovery action.

The method, system, and program product of our invention addresses this problem by creating a register file, e.g., an error accumulation register, to collect a history of the error state information for each core. The core error state data can be analyzed to understand the recovery sequence of events. The recorded error sequence over time presents a detailed history of the recovery sequence which is useful to understand complex error scenarios. Complex error scenarios occur when a recoverable error is escalated to a more severe level error and the reason for the more severe error needs to be understood. The advantage here is time saved in analysis and the accuracy in determining the sequence using only the available end state. Error analysis is faster and more exact with a recorded history of both cores recovery sequences.

The error accumulation register 23 is used to capture error states between the locking of the first or primary WOF error register 21, up until the time the secondary WOF register 25 is enabled. The advantage of capturing error sate information between the initial error and the last recovery reset event (id cache (11) reset) is to capture and preserve any additional error states that may occur during the steps of the recovery process prior to checkpoint refresh when the secondary WOF 25 is enabled. The additional state collected in the error accumulation register 23 represents in time the recovery state steps where pipe drain and the release of the state queue is performed for each core. Error state collected during this time can be analyzed to explain the reason for a higher level of recovery action taken then the expected action based on the initial error captured in the primary WOF register 21.

The design herein contemplated utilizes a WOF (Who's on first logic structure) error checker. For every WOF error checker there is a latch which is set to ON when the checker detects an error. Prior to design closure on every hardware element, each error checker is examined as to the domain of failures which can cause the checker to come on. This analysis takes into account the total system set of error checkers, including special hardware which determines which error checker came on first.

The logic structure which supports this procedure is sometimes called "who's on first" (WOF). The WOF limits the domain of any error checker backward in the data or control flow to the previously checked signal source, and resolves any ambiguity due to error propagation. To keep the wiring within reasonable bounds, the WOF structure is actually implemented as a hierarchy of global, MCM, and chip-internal FIR registers, which are examined sequentially to determine the source domain of an error. In particular cases, the WOF counters on each chip are examined in order to pinpoint which chip first detected an error. This critical hardware analysis is performed so that the self-diagnostic field replacement call is deterministic, not requiring manual interpretation.

Capture and hold latches are used to shadow each bit of the primary WOF register 21. The primary WOF register 21 has a common lock mechanism which prevents any new error state from being collected once the first error is captured. The latches that form the accumulation register 23 capture the same initial primary WOF error and any new error state after the primary WOF 21 is locked up until the recovery reset event, controlled by the recovery state machines 15 and the recovery synch signals 17, occur. The recovery reset event is used as a common lock for the latches that form the accumulation register 23. The accumulation register 23 lock is cleared with a millicode write to the same register address, e.g., through interface 13.

An example of a recoverable error detected on one core that escalates to a checkstop:

1) D-Cache Recoverable error detected
2) Block of local Checkpoint update, primary RU and BCE WOF registers capture and lock on first error detected.
3) Recoverable error signal sent to signal the other core to drain execution pipe and block its local Checkpoint update 4) Reset non-checkpoint units
5) Drain Local Store Queue
6) Local Store Queue Drain did not complete, hardware hang time out. Error escalated to IPD level.
7) Bad core drain bypassed, wait until the other core completes drain of the Store Queue, first recovery synchronization point between cores.
8) Fence common L2 (11)
9) Reset checkpoint units
10) Start ABIST
11) Wait until ABIST done on both cores, second recovery synchronization point between cores, secondary WOF Enabled.
12) Refresh architected registers from checkpoint state Pass-1
13) Refresh architected registers from checkpoint state Pass-2 (any single bit errors corrected)
14) Initiate I-fetch from checkpoint Instruction Address
15) Forward Progress Test The recovery state trace is organized as a push down stack twelve registers deep by fifteen bits wide. When a recovery state trigger event is satisfied the current recovery state is captured and held in the first register at the top of the stack, read address zero. The previous contents of the first register are pushed to the second, the second is pushed to the third, this continues until the last register contents are pushed and lost off the stack. There is no hardware provided to prevent or detect a stack overflow. The recovery stack contains the recovery state of the last twelve recovery trigger events, where read address zero contains the most recent and read address eleven contains the oldest. A recovery state trigger event occurs when a change is detected between the current recovery state and the previous recovery state. The rate of the recovery trigger event is programmable by using a bit mask and an optional state change or transition change from the current state to the previous state comparison, this is used to control the resolution of the recovery state captured.

The invention may be implemented, for example, by having the system creating a register file to collect a history of the error state information for each core. The core error state data can be analyzed to understand the recovery sequence of events. The recorded error sequence over time presents a detailed history of the recovery sequence which is useful to understand complex error scenarios executing the method as a software application, in a dedicated processor or set of processors, or in a dedicated processor or dedicated processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for by having the system for creating a register file to collect a history of the error state information for each core. The core error state data can be analyzed to understand the recovery sequence of events. The recorded error sequence over time presents a detailed history of the recovery sequence which is useful to understand complex error scenarios, executing the method as a software application.

The signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:
1. A method of capturing machine error states in a multi-core chip having more than one CPU core on the chip, comprising:
   a. collecting in a register file the error state information for each core;
   b. capturing error states in an error accumulation register between:
      i. locking a primary error register, and
      ii. enabling a secondary error register;
   c. initiating recovery action based on the error state information; and
   d. collecting a recovery state trace in a push down stack.

2. A multi core integrated circuit chip having at least two CPU cores in a single integrated circuit chip, said integrated circuit further comprising a plurality of primary and secondary WOF registers, and a plurality of error accumulation registers, said integrated circuit chip adapted to a method of capturing machine error states in the multi-core chip, comprising the steps of:
   a. collecting in a register file the error state information for each core;
   b. capturing error states in an error accumulation register between:
      i. locking a primary error register, and
      ii. enabling a secondary error register;
   c. initiating recovery action based on the error state information; and
   d. collecting a recovery state trace in a push down stack.

3. A program product comprising a computer readable storage medium having computer readable code thereon to configure and control a computer having a multi-core chip, said multi-core chip having more than one CPU core on the chip, to perform a method of capturing machine error states in the multi-core chip, comprising:
   a. collecting in a register file the error state information for each core;
   b. capturing error states in an error accumulation register between:
      i. locking a primary error register, and
      ii. enabling a secondary error register;

c. initiating recovery action based on the error state information; and
d. collecting a recovery state trace in a push down stack.

4. A method of providing a service to capture machine error states in a multi-core chip having more than one CPU core on the chip, comprising:
   a. collecting in a register file the error state information for each core;
   b. capturing error states in an error accumulation register between:
      i. locking a primary error register, and
      ii. enabling a secondary error register;
   c. initiating recovery action based on the error state information; and
   d. collecting a recovery state trace in a push down stack.

5. A computer program product embodied in a computer readable storage medium comprising:
computer readable program codes coupled to the computer readable storage medium to capture machine error states in a multi-core chip having more than one CPU core on the chip, the computer readable program codes configured to cause the program to:
   a. collect in a register file the error state information for each core;
   b. capture error states in an error accumulation register between:
      i. locking a primary error register, and
      ii. enabling a secondary error register;
   c. initiate recovery action based on the error state information; and
   d. collect a recovery state trace in a push down stack.

* * * * *